No. 772,385. PATENTED OCT. 18, 1904.
F. SMITH.
GARMENT FASTENER.
APPLICATION FILED MAR. 16, 1903.
NO MODEL.
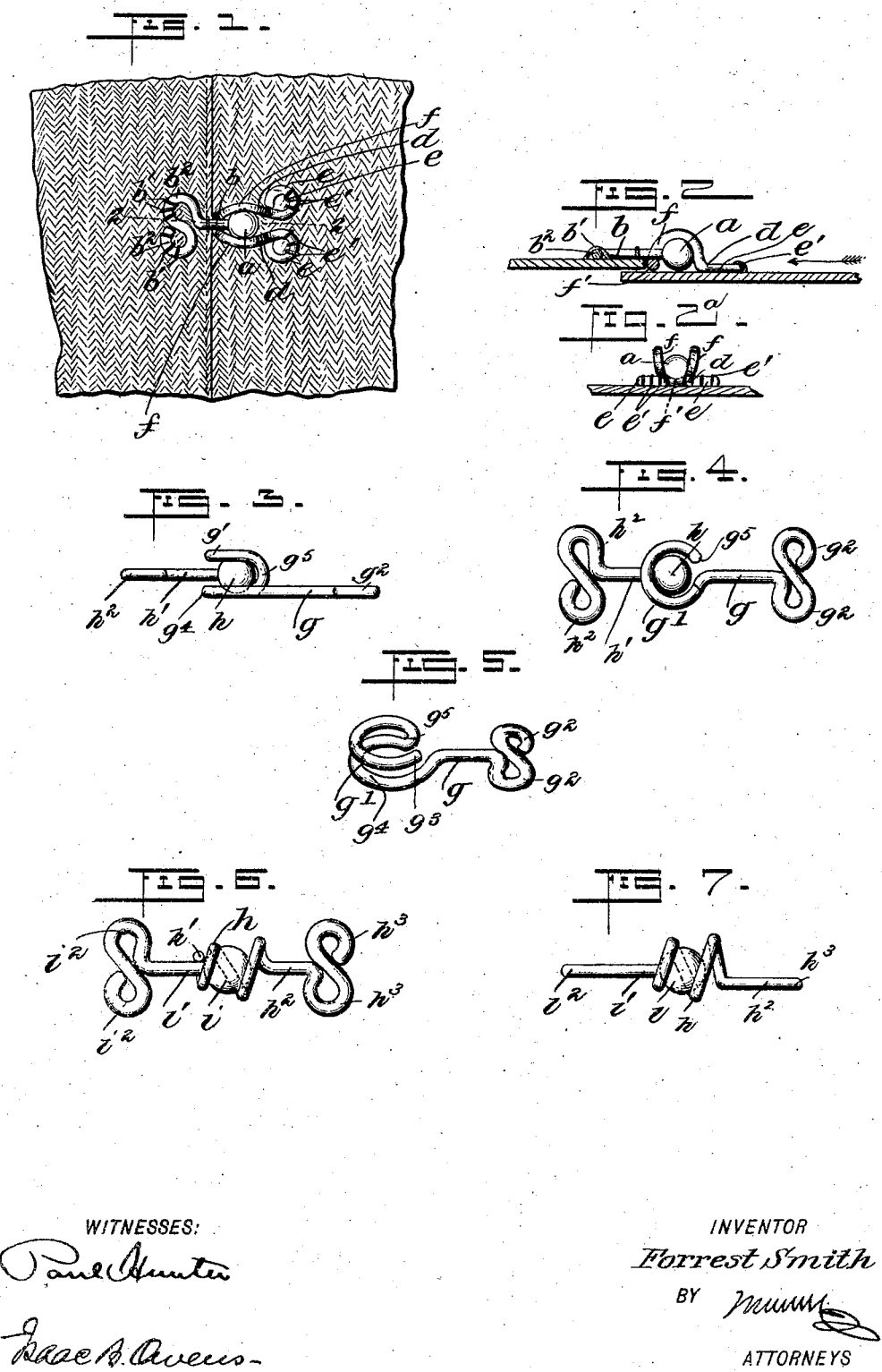
WITNESSES:
INVENTOR
Forrest Smith
BY
ATTORNEYS No. 772,385. Patented October 18, 1904.

UNITED STATES PATENT OFFICE.

FORREST SMITH, OF COUNCIL BLUFFS, IOWA.

GARMENT-FASTENER.

SPECIFICATION forming part of Letters Patent No. 772,385, dated October 18, 1904.

Application filed March 16, 1903. Serial No. 148,104. (No model.)

*To all whom it may concern:*

Be it known that I, FORREST SMITH, residing at 740 Madison avenue, Council Bluffs, in the county of Pottawattamie and State of Iowa, have invented certain useful Improvements in Garment-Fasteners; and I do hereby declare that the following is a full, clear, and exact description of the invention, such as will enable others skilled in the art to which it appertains to make and use the same, reference being had to the accompanying drawings, which form a part of this specification.

The invention relates to a fastener useful in connection with cloths and garments of various sorts, particularly the garments of women and children.

The prime object of the invention is to provide a device in which the two parts of the fastener may be readily engaged with each other and when so engaged will not be liable to accidental disconnection and which will allow a large freedom of movement between the two fastener parts without endangering said disconnection.

To this end the invention comprises a garment-fastener the parts of which are connected with each other by means of a ball-and-socket joint, one part of the fastener comprising a relatively slender or rod-like stem with a ball at the end thereof and the other part comprising a length of wire bent to form a skeleton socket in which the ball may be received, so as to allow the ball a free-rolling movement in the socket, thus allowing the fastener parts a large degree of independent movement while engaged with each other. The advantage of this free-rolling relative movement of the engaged fastener-sections is that it allows the fastener to accommodate itself to the unavoidable relative movement of the two parts of a garment or other fabric structure to which the fastener may be applied.

The invention involves various other features of major or minor importance, and all will be fully set forth hereinafter.

This specification is an exact description of several forms of my invention, while the claims define the actual scope thereof.

Reference is to be had to the accompanying drawings, forming a part of this specification, in which similar characters of reference indicate corresponding parts in all the views.

Figure 1 is a plan view showing one form of my improved garment-fastener in use. Fig. 2$^a$ is an elevation looking in the direction indicated by the arrow in Fig. 2. Fig. 2 is a longitudinal section of the garment-fastener on the line 2 2 of Fig. 1. Fig. 3 is a side elevation of a modified form of the invention. Fig. 4 is a plan view of the same. Fig. 5 is a perspective view of the socket member of the form shown in Figs. 3 and 4. Fig. 6 is a plan view of a still further modification of the invention, and Fig. 7 is a side elevation thereof.

The form of the invention shown in Figs. 1, 2, and 2$^a$ comprises a ball member formed of a ball $a$, attached to a relatively slender or rod-like stem $b$, formed, preferably of wire, and the said stem terminating in eyes $b^2$, adapted to be secured to the part in connection with which the ball member is used by means of stitches $b'$ or other suitable devices. Said form of the invention also comprises a socket member having a skeleton socket formed of two approximately parallel laterally-disposed curved members $f$, connected by a bight $f'$. The skeleton socket conforms, essentially, to the size and shape of the ball $a$. Said socket is carried by a stem $d$, which has two parts connected, respectively, to the curved members $f$ and terminating in eyes $e$, adapted to be secured to the part in connection with which the socket member is used by means of stitches $e'$ or equivalent devices. Preferably the socket member is formed of a single length of wire bent into the form described. The two parts of the stem $d$ are slightly resilient and at points adjacent to the eyes $e$ are sufficiently spaced apart to allow, aided by their resiliency, the entrance of the ball $a$ between them. The curved members $f$ of the skeleton socket are sufficiently spaced apart not only to receive between them the stem $b$, but to allow the same a free swinging movement in all directions without, however, disturbing the position of the ball $a$ within the socket.

To engage the parts of the fastener together, the edges of the two parts of the garment or cloth should be slightly overlapped, the stem of the ball member disposed laterally of the socket member, and the ball inserted between the two parts of the socket-member stem. After this the two fastener-sections should be moved as though to separate them and simultaneously turned into essentially longitudinal alinement, causing the ball to bear in the socket and the stem $b$ of the ball member to be projected outward therefrom. As long as the strain on the sections is essentially longitudinal the disconnection thereof is impossible, notwithstanding that universal movement of the sections one with respect to the other is freely permitted. To disconnect the parts, a reversal of the above-described action is necessary.

The form of the invention shown in Figs. 3, 4, and 5 differs from that shown in Figs. 1, 2, and 2$^a$ only in the form of the socket member. In said Figs. 3, 4, and 5, $h$ indicates the ball, $h'$ the stem, and $h^2$ the eyes constituting the ball member. In this form of the invention the socket member comprises a stem $g$, terminating at one end in eyes $g^2$ for aiding in fastening it in place. At the other end the stem carries the skeleton socket, which, as best shown in Fig. 5, consists of two laterally-disposed essentially parallel curved members $g'$ and $g^4$, connected by a bight $g^5$, and one of said members being joined to the stem $g$, as shown. Preferably the socket member is formed of a single length of wire.

In engaging together the sections of the fastener of the form shown in Figs. 3, 4, and 5 the ball should be entered into the socket by disposing the stem $h'$ transversely of the stem $g$ and passing the ball into the socket by entering the stem $h'$ between the end $g^3$ of the curved member $g'$ and the shank $g$ of the socket member. After the ball has been seated in the socket the stem $h'$ should then be turned to lie longitudinally of the stem $g$, as Figs. 3 and 4 illustrate. To disengage the parts, a mere reversal of the above movement is necessary. It will be observed that this modified form of the invention attains essentially the same results as those obtained by the construction shown in Figs. 1, 2, and 2$^a$.

The form of the invention shown in Figs. 6 and 7 has a ball member comprising the ball $i$, stem $i'$, and eyes $i^2$, essentially the same as the ball members before described. The socket member comprises a stem $h^2$, having eyes $h^3$ at one end thereof, the same as described in Figs. 3, 4, and 5. The skeleton socket $h$ in Figs. 6 and 7, however, is produced by spirally bending the wire, this bend having two or more convolutions, as shown, and said convolutions decreasing in diameter as they pass outward from the stem, the smaller or smallest convolution lying at the terminal $h'$ (see Fig. 6) of the wire of which the socket member is formed.

In order to engage together the socket and ball members constructed as in Figs. 6 and 7, the ball should be placed in the largest convolution of the spiral forming the socket, the stem lying outside of the same laterally of the stem $h^2$, after which the stem of the ball member is turned spirally through the convolutions of the spiral forming the socket and finally passes within the smallest convolutions located at the end $h'$ of the wire of which the socket is formed, this convolution being of sufficient diameter to allow the before-referred-to free universal movement of the ball and stem forming the ball member with respect to the socket member. To disengage the parts, a reversal of the above movement should be effected.

The fastener constructed in accordance with my invention is adapted for use on garments, blankets, tents, and, indeed, to all uses where two fabrics are to be connected with each other. Its principal advantages lie in its absolute security against accidental disconnection, in the strength, and in the free-rolling or ball-and-socket like relative movement incident to the ball-and-socket joint. Also it may be readily constructed and by forming the socket member in suitable dies the fasteners may be manufactured at a very low cost.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A garment-fastener, comprising a ball member having a relatively slender or rod-like stem and a ball at the end thereof, and a socket member formed of wire bent to comprise a stem, and a skeleton socket corresponding essentially to the shape and size of the ball and capable of loosely receiving the ball of the ball member with the said rod-like stem thereof projecting through and beyond the socket and of allowing the ball a free-rolling or ball-and-socket movement within the socket without disengaging the parts of the fastener.

2. A garment-fastener, comprising a ball member having a relatively slender or rod-like stem and a ball at the end thereof, and a socket member formed of wire bent to comprise a stem, and a skeleton socket corresponding essentially to the shape and size of the ball and capable of loosely receiving the ball of the ball member with the said rod-like stem thereof projecting through and beyond the socket and of allowing the ball a free-rolling or ball-and-socket movement within the socket without disengaging the parts of the fastener, the said skeleton socket being formed of two laterally-disposed essentially parallel curved members connected by a bight.

3. A garment-fastener, comprising a ball member having a relatively slender or rod-like stem and a ball at the end thereof, and a socket member formed of wire bent to comprise a stem, and a skeleton socket corresponding essentially to the shape and size of the ball and capable of loosely receiving the ball of the ball member with the said rod-like stem thereof projecting through and beyond the socket and of allowing the ball a free-rolling or ball-and-socket movement within the socket without disengaging the parts of the fastener, the said skeleton socket being formed of two laterally-disposed essentially parallel curved members connected by a bight, and the stem of the socket member being formed of two parts respectively joined to the said curved members of the socket.

In testimony whereof I affix my signature in presence of two witnesses.

FORREST SMITH.

Witnesses:
 JOHN T. LUTZ,
 S. L. IRVINE.